US012791680B2

(12) United States Patent
Junique et al.

(10) Patent No.: US 12,791,680 B2
(45) Date of Patent: Nov. 10, 2026

(54) METHOD FOR LOCATING A TARGET BY MEANS OF A DETECTOR HAVING A PLURALITY OF QUADRANTS

(71) Applicant: Safran Electronics & Defense, Paris (FR)

(72) Inventors: Pascal Junique, Moissy-Cramayel (FR); Farid Oudyi, Moissy-Cramayel (FR); Marion Sand, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 350 days.

(21) Appl. No.: 18/712,592

(22) PCT Filed: Nov. 23, 2022

(86) PCT No.: PCT/FR2022/052165

§ 371 (c)(1),
(2) Date: May 22, 2024

(87) PCT Pub. No.: WO2023/094770

PCT Pub. Date: Jun. 1, 2023

(65) Prior Publication Data

US 2025/0012900 A1 Jan. 9, 2025

(30) Foreign Application Priority Data

Nov. 23, 2021 (FR) ...................................... 2112328

(51) Int. Cl.
*G01S 7/4863* (2020.01)
*F41G 7/22* (2006.01)
(Continued)

(52) U.S. Cl.
CPC .......... *G01S 7/4863* (2013.01); *F41G 7/2293* (2013.01); *G01S 3/784* (2013.01);
(Continued)

(58) Field of Classification Search
None
See application file for complete search history.

(56) References Cited

U.S. PATENT DOCUMENTS 7,870,816 B1 * 1/2011 Willingham ............ F41G 3/145 89/204
2011/0073704 A1 * 3/2011 Jenkins .................. F41G 7/008 244/3.16

(Continued)

OTHER PUBLICATIONS

Xue et al., "Quadrant Uniformity Calibration Method for Four Quadrant Photodetectors," SPIE Proceedings, vol. 11023, XP060116290, 6 pages.

(Continued)

*Primary Examiner* — Luke D Ratcliffe

(74) *Attorney, Agent, or Firm* — Birch, Stewart, Kolasch & Birch, LLP

(57) ABSTRACT

The invention relates to a method for locating a target by means of a detecting device comprising a photodetector comprising N×M quadrants positioned with respect to a sighting axis of the detecting device, the photodetector being configured to detect optical signals from the target to be detected, said method being implemented in a processing unit of said device and comprising the following steps, the target scattering an optical signal: —acquiring the signals detected by each quadrant, which correspond to the signals scattered by the target toward the quadrants; —processing the acquired signals to determine an elevation angle error and an azimuth angle error of the direction of the target with respect to the sighting axis of the device; —processing the acquired signals with a view to deducing therefrom indicators of the distribution of the signals detected by the quadrants; —processing the determined elevation angle error and azimuth angle error with a view to deducing therefrom indicators of the theoretical distribution of the signals in the
(Continued)

quadrants for these angle errors; —verifying the coherence of the theoretical distribution indicators with the distribution indicators obtained using the acquired signals so as to determine whether the measured angle error is valid.

11 Claims, 7 Drawing Sheets

(51) Int. Cl.

| | |
|---|---|
| ***G01S 3/784*** | (2006.01) |
| ***G01S 3/786*** | (2006.01) |
| ***G01S 13/44*** | (2006.01) |
| ***G01S 17/66*** | (2006.01) |

(52) U.S. Cl.

CPC .......... *G01S 3/786* (2013.01); *G01S 13/4445* (2013.01); *G01S 17/66* (2013.01); *F41G 7/226* (2013.01)

(56) References Cited

U.S. PATENT DOCUMENTS

| | | | | |
|---|---|---|---|---|
| 2013/0070238 | A1 | 3/2013 | Crawford et al. | |
| 2013/0070239 | A1* | 3/2013 | Crawford ................ | F41G 7/001 356/139.04 |
| 2021/0219409 | A1* | 7/2021 | Baumer .................. | G01S 3/784 |

OTHER PUBLICATIONS

Zhang et al., "Quadrant Response Model and Error Analysis of Four-Quadrant Detectors Related to the Non-Uniform Spot and Blind Area," Applied Optics, vol. 57, No. 24, XP055954149, pp. 6898-6905.

* cited by examiner

METHOD FOR LOCATING A TARGET BY MEANS OF A DETECTOR HAVING A PLURALITY OF QUADRANTS

TECHNICAL FIELD

The invention relates to the field of detecting a target by means of a detector having a plurality of quadrants, the target preferably being illuminated. The invention has application, in particular, in the field of the semi-active laser guidance of an object toward the target, for automatic guidance of air-to-surface or surface-to-surface weapons.

PRIOR ART

A device for locating a target comprising a photodetector having four quadrants exploits a flux scattered by the target to be detected, in order to measure the direction of the target in its aiming mark. Such locating enables, in particular, tracking of a moving target such as an aeroplane, machine, missile, vehicle, tank etc. such a device can be mounted on a guidance system, for example a self-guided missile, or on a firing station, making it possible to track a beacon carried by the missile and a target.

The deviation between the sighting axis and the direction of the target is the angle error or angular deviation or angular loss of aim. In the case of guidance, this angle error is usually either reduced to zero or kept constant so that the guidance system comprising the locating device is correctly guided to the target.

The target may emit light naturally. However, in the context of a semi-active laser guidance, a high-power laser beam with low divergence emitted by a designator marks the target, and the laser flux scattered (backscattered) by the target is then used to measure the angle error. The designator is, for example, incorporated in the viewfinder or even carried by a third-party co-operative device.

In particular, two categories of guidance systems or sensors are known, which exploit such a laser flux scattered by the target to be located.

Laser spot trackers (LST) are pieces of equipment incorporated in a viewfinder, the function of which is to ensure that the laser beam emitted by the designator is well positioned on the target. An LST is more precisely a deviation indicator which determines the angular direction of the laser flux scattered by the target and this direction is compared to the direction of the target observed in a imager harmonised with the LST.

Homing devices or semi-active laser deviation indicators, designated by the term SALH, are incorporated in weapons and provide them with the ability to guide themselves with precision onto the laser spot positioned on the target which may be fixed, movable or mobile.

The main functions of these systems are as follows:

detection of a laser flux reflected by the pointed target and associated with the designation laser:

tracking this target based on the reflection of the laser flux held positioned thereon;

providing an angle error of the target in the reference frame of the LST sensor or SALH sensor.

For location and guidance, a usual solution consists of using a multi-quadrant photodetector, in particular a four-quadrant photodetector, the photodetecting surface of which is in the form of a disc or square divided into four equal and independent photodetection surfaces. This photodetector is associated with a flux collecting optic enabling a more or less localised energy distribution, typically a homothetic disc of the illumination in the entry pupil of the optic, on the active surface of the photodetector. The position of this energy distribution depends on the angular direction of origin of the incident flux.

The level of energy collected by each of the quadrants thus varies according to this direction and it is this which enables the angle error to be determined.

Consider as an example a four-quadrant photodetector. In order to determine the angle error, the operations to be carried out with a four-quadrant detector consist of two comparisons of the signals received on the paired sectors: on the one hand, the sum of 2 quadrants at the top versus the sum of 2 quadrants at the bottom and, on the other hand, the sum of 2 quadrants on the left versus the sum of two 2 quadrants on the right. Two weightings of the detected signal are carried out along the vertical and horizontal axes. Then a tabulation previously performed in the factory is applied and gives the true angular positions in elevation and azimuth of the spot in relation to the reference frame of the detector, corresponding with the top-bottom and left-right weighting values.

This conversion step between weightings and angle error assumes that the energy distribution on the four-quadrant detector is identical in the means implemented at the factory and in the context of use.

However, this is not always the case.

The angle error precision is sometimes degraded, in particular in the presence of atmospheric turbulence or strong light phenomena.

More specifically, the laser signals generated by the four quadrants of the photodetector, corresponding to the illumination of the sensor originating from the designation of the target, may be disturbed:

a) parasitic sources emit a photonic flux partially included in the spectral band of the optical filter of the sensor and with a modulation which is not totally rejected by the electronic filtering adapted to the temporal modulation of the designation laser; these stimuli are added to the laser signal and can potentially modify the response of the system to the useful laser signal;

b) the environment of the scene influences the propagation of the laser wavefront from the designator to the target, then from the target to the sensor; turbulence present on these paths generates scintillation effects which are manifest by modulations of illumination inside the optical pupil of the sensor.

Disturbances of type a) result from the problem described below.

Analogue and digital electronics systems have the function of filtering the signal captured by each channel or quadrant of the four-quadrant photodetector, for the purpose of detecting and recognising the temporal coding; and elaborating the information necessary for measuring the four energy portions of the laser pulses, for the purpose of locating the target. The elements of the electronic system must be able to guarantee good restitution of the laser angle errors, including in the case of multi-echoes with two pulses close together in time.

These requirements impose a compromise during design, between the sensitivity of the sensor, its instantaneous measurement dynamics, the effectiveness of the filtering of interference and the reliability of the restitution of the four pieces of energy information and therefore the precision of deviation measurement.

Distortion or saturation of one of the four useful signals can occasionally occur in the presence of intense parasitic modulations.

The signals coming from the four quadrants and used for carrying out the calculations of the two weightings, are then biased by the amputation of the laser signal on the distorted or saturated quadrant(s).

With regard to disturbances of type b), the problem is as follows.

The variations in the refractive index of the air on the path of the laser are manifest by an inhomogeneous illumination on the optical pupil of the sensor, and these inhomogeneities vary from the reception of one laser pulse to the next.

This non-uniformity, which varies over time, is reflected by modulations in the energy distribution on the photodetector and disturbs the two weightings.

For weak disturbances, the angle error noise is aggravated but does not jeopardise the success of the mission.

For strong disturbances, the dispersion of the angle error measurements delivered, hampers the location and guidance.

DISCLOSURE OF THE INVENTION

The invention proposes to overcome at least one of these disadvantages and, in particular, proposes diagnosing the two types of degraded operation: (a) saturation of the electronic system in the presence of strong background modulation and (b) inhomogeneity in illumination of the pupil in the presence of turbulence.

For this purpose, the invention relates to a method for locating a target by means of a detecting device comprising a photodetector comprising N×M quadrants positioned with respect to a sighting axis of the detecting device, the photodetector being configured to detect optical signals from the target to be detected, said method being implemented in a processing unit of said device and comprising the following steps, the target scattering an optical signal:

- acquiring the signals detected by each quadrant, which correspond to the signals scattered by the target toward the quadrants;
- processing the acquired signals to determine an elevation angle error and an azimuth angle error of the direction of the target with respect to the sighting axis of the device;
- processing the acquired signals with a view to deducing therefrom indicators of the distribution of the signals detected by the quadrants;
- processing the determined elevation angle error and azimuth angle error with a view to deducing therefrom indicators of the theoretical distribution of the signals in the quadrants for these angle errors;
- verifying the coherence of the theoretical distribution indicators with the distribution indicators obtained using the acquired signals so as to determine whether the measured angle error is valid.

The invention is advantageously supplemented by the following features, taken individually or in any of the possible technical combinations thereof:

- the theoretical distribution indicators of the signals in the quadrants is obtained by interpolation, preferably bilinear interpolation, of the angle errors with a mapping of the theoretical distribution indicators of the signals as a function of a plurality of theoretical angle errors;
- the photodetector comprises quadrants distributed along two perpendicular axes, referred to as elevation Z and azimuth Y axes, the distribution indicators of the signal in the quadrants being obtained by means of theoretical and measured weighting values, said weightings being based on the signal levels detected by the quadrants;
- the N×M quadrants of the photodetector are distributed along two mutually perpendicular axes, referred to as the elevation axis Z and azimuth axis Y, the quadrants detecting a signal defining a sub-matrix included in the N×M matrix, of size Ni×Mi quadrants, with Ni less than or equal to N, and Mi less than or equal to M, and detecting signals, the distribution indicators of the signals being obtained by comparing the signals detected on adjacent quadrants taken along the rows of the Ni×Mi matrix on the one hand, and taken along the columns of the Ni×Mi matrix, on the other hand;
- verifying the coherence consists of calculating a comparison criterion between a first metric based on the theoretical distribution indicators and a second metric based on the distribution indicators of the acquired signals, the criterion being compared with a threshold in order to validate the angle error measurements;
- the comparison criterion is defined by an absolute difference between the first and second metrics, the angle error being valid if this criterion is less than a threshold and invalid if this criterion is greater than or equal to said threshold;
- the threshold is adjusted as a function of the signal-to-noise ratio measured on each quadrant and/or of the determined angle error;
- the photodetector comprises four quadrants A, B, C, D, quadrants A and B being above the elevation axis Z, quadrants C and D being below the axis Z, quadrant C being below quadrant A, quadrant D being below quadrant B, the distribution criteria of the signals over the quadrants being defined in the following manner:

$Y_1=(B-A)/(A+B)$, weighting comparing the top two signals;

$Y_2=(D-C)/(C+D)$, weighting comparing the bottom two signals $Y=(B+D-A-C)/(A+B+C+D)$ weighting comparing the signals on either side of the vertical axis;

$Z_1=(A-C)/(A+C)$, weighting comparing the two signals on the left $Z_2=(B-D)/(B+D)$, weighting comparing the two signals on the right $Z=(A+B-C-D)/(A+B+C+D)$ weighting comparing the signals on either side of the

- the metrics based on the theoretical or measured distribution criteria are defined by max ([abs($Y_1-Y_2$); abs($Z_1-Z_2$); abs($Y_1-Y$); abs($Z_1-Z$); abs($Y_2-Y$), abs($Z_2-Z$)]) with max the maximum value and abs the absolute value.

The invention also relates to a device for detecting a target comprising a photodetector with a plurality of quadrants and a processing unit configured to implement a method according to the invention.

The invention also relates to a system for guiding a missile towards a moving target, said device including a detection device according to the invention.

The invention also relates to a computer program product comprising code instructions for implementing a method according to the invention when this is executed by a computer.

Thus, the invention enables a comparison between the measured signals coming from quadrants of the photodetector and levels which respect the theoretical energy distribution in order to validate the angle error measurements.

The invention makes it possible to identify erroneous angle error measurements caused by a degraded operation.

The invention makes it possible to increase the reliability of the deviation measurement function by the addition of a criterion on the geometries and radiometry of the spot on the photodetector.

Through the invention, an analysis of the coherence of the signals with respect to the theoretical distribution (typically a disc) makes it possible to determine that the uniformity of the illumination in the optical pupil is significantly degraded following scintillation phenomena on the paths of the laser from the designator to the target and/or from the target to the sensor or even degradation due to the electronic system as indicated above.

Thus, knowing how to identify a degraded operation, it is possible to implement corrective measures:

- invalidating the aberrant angle errors;
- filtering the noisy angle errors over time, before their exploitation by the tracking turret of the designation system (LST sensor case) or by the weapon guidance system (SALH sensor case);
- putting in place, if needed, a device for reducing scintillation effects; being detrimental to optical transmission and therefore sensitivity, it is not desirable to have such a reducer device permanently in the optical path;
- implementing, if needed, an adjustment of the electronic detection system that is more robust with respect to the modulations under strong light; being detrimental to the sensitivity, it is not desirable to have to apply this adjustment systematically.

DESCRIPTION OF THE FIGURES

Other features, aims and advantages of the invention will emerge from the following description, which is given purely by way of illustration and not being limiting and which should be read with reference to the attached drawings, in which.

In all the figures, similar elements have identical reference signs.

DETAILED DESCRIPTION

Locating Device

Figure 1:
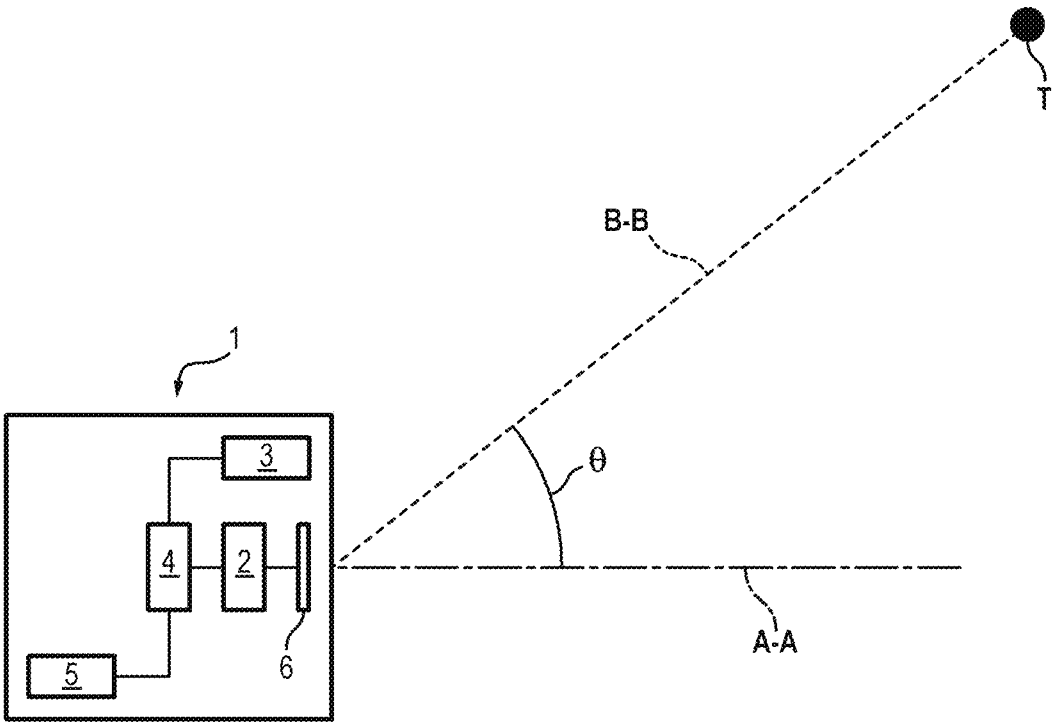
FIG. 1 illustrates a device for locating a target according to an embodiment of the invention.

FIG. 1 illustrates a device 1 for locating a target T, comprising a photodetector 2 with a plurality of quadrants and more precisely with N×M quadrants, with N and M greater than or equal to two.

This planar photodetector 2 is behind an optic 6 through which light rays from the target T to be located pass. Such an optic 6 is, for example, a convergent lens. In a complementary manner, the locating device comprises an emission unit 3 of a beam, known by the term designator, enabling illumination of the target T. In the case of semi-active laser guidance, the emitted beam is a laser beam. In another example, the beam is emitted by an emitter of a beacon carried by a remotely guided munition, of the LED emitter type or any other photonic emitter associated with a temporal modulation.

In the following, the case is considered in which the target returns on optical flux coming from the illumination by the designator 3.

The locating device 1 and the photodetector 2 are positioned with respect to a sighting axis AA which forms an angle error θ with the direction BB of the target T. This angle error θ is measured by means of the distribution of optical signals, in other words the optical flux backscattered by the target, on the quadrants of the photodetector 2.

Figure 2:
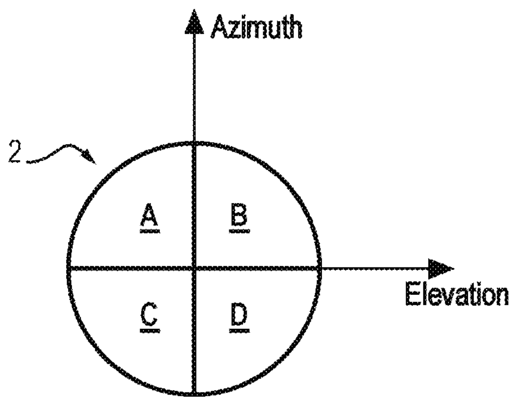
FIG. 2 schematically illustrates a four-quadrant photodetector.

FIG. 2 illustrates a photodetector with four quadrants, denoted A, B, C, D. In this example, the quadrants are in the form of angular sectors of a concentric ring, arranged in a matrix where N×M=2×2 quadrants.

Figure 3A:
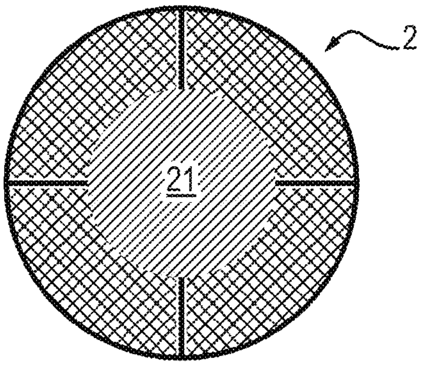
FIGS. 3*a* and 3*b* illustrate detection configurations by a four-quadrant photodetector.
Figure 3B:
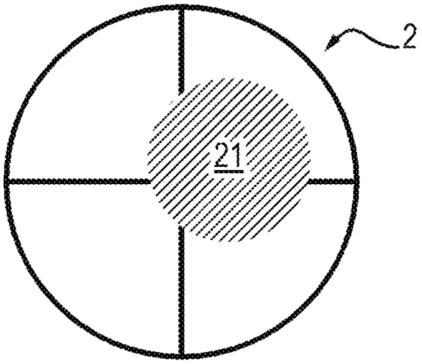

In operation, the photodetector 2 being centred on the sighting axis AA, the optical signals detected by the photodetector 2 form a spot 21 centred, as illustrated in FIG. 3*a*, when the sighting axis AA is aligned on the direction of the target; otherwise, it is not centred, as illustrated in FIG. 3*b*. The centre of the spot constitutes the coordinates of the angle error θ in elevation and in azimuth and corresponds to the energetic barycentre of the spot defined on the basis of the weightings along the elevation and azimuth axes. Each weighting is based on the signal levels detected by each quadrant.

The photodetector 2 is configured to detect optical signals scattered by the target. It is connected to a processing unit 4 which makes it possible, in particular, to measure the angle error and to validate this measurement according to a method which will be described below.

The processing unit 4 comprises an electronic system (not described or detailed because it is well known to a person skilled in the art) connected to each quadrant of the photodetector 2 in order to acquire the electronic signals corresponding to the optical flux detected by each quadrant and integrated by the photodetection surface of the quadrant.

Figure 4:
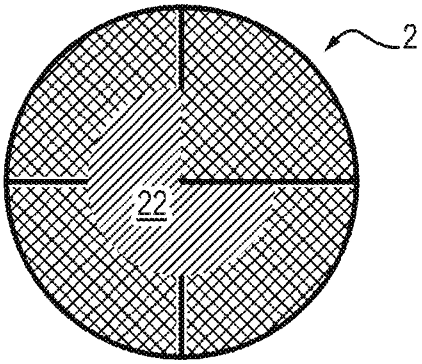
FIG. 4 illustrates a degraded detection configuration by means of a four-quadrant detector.

As indicated in the introduction, the angle error may be false when the photodetector operates in degraded mode. FIG. 4 illustrates a case of degraded operation, corresponding to the illumination example of FIG. 3*a*; in FIG. 3*a* the energy distribution in the quadrants is nominal; the spot is indeed present in its entirety, and here the signal levels measured on each quadrant are equal. In FIG. 4, for the same angle error, the energy distribution of the spot 22 in the quadrants is incoherent; the signal level measured on quadrant B is zero following a dysfunction of quadrant B, for example in the case of a saturation of the electronic system of quadrant B. There is an incoherence between the distribution of the signals in the quadrants and the theoretical distribution associated with an angle error, such as that calculated based on the acquired signals in the case of FIG. 4.

It is on the observation of this incoherence that the method of the invention is based; a method implemented in the processing unit 4 of the device described above.

Figure 11A:
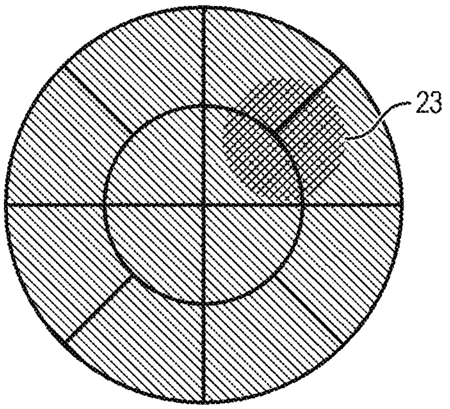
FIGS. 11*a* and 11*b* illustrate various quadrant arrangements to which the invention can be applied.

Such a principle applies to any photodetector 2 comprising a plurality of quadrants, arranged in a matrix of size N×M quadrants, N×M being greater than or equal to four. Examples are shown here of quadrants conventionally arranged in a matrix, but this can be any arrangement, as illustrated, by way of example, in FIGS. 11*a* and 11*b*. Such arrangements, other than a conventional matrix, can minimise the number of processing paths for covering a field of view. This is the case, for example, for an arrangement of 4×3 quadrants corresponding to sectors of a concentric ring, as illustrated in FIG. 11*a*.

Figure 11B:
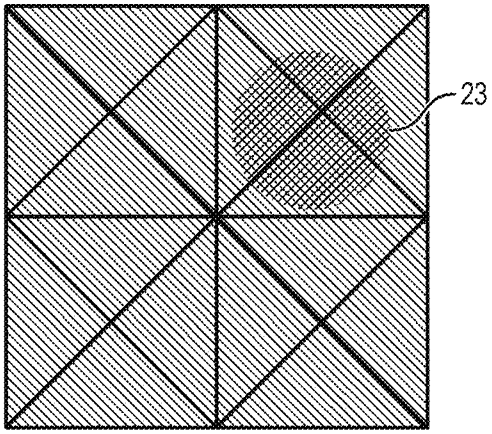

Other arrangements can advantageously have a geometry which facilitates the connexion of output signals by having a proximity to the periphery for each quadrant. This would be the case, for example, for the arrangement of 4×4 quadrants consisting of triangles, illustrated in FIG. 11*b*. In FIGS. 11*a* and 11*b*, the detected spot 23 is represented by a disc.

Figure 5:
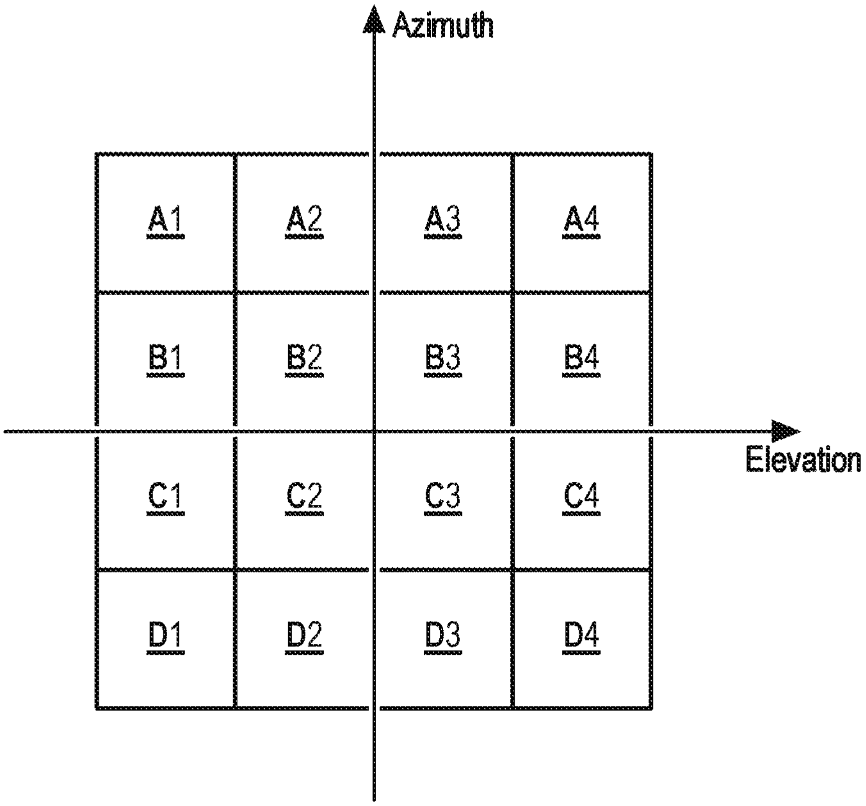
FIG. 5 illustrates a photodetector with 16 quadrants arranged in a matrix.

FIG. 5 illustrates an example of a photodetector 2 comprising a matrix with N×M=4×4 quadrants, $A_1$, $A_2$, $A_3$, $A_4$, $B_1$, $B_2$, $B_3$, $B_4$, $C_1$, $C_2$, $C_3$, $C_4$, $D_1$, $D_2$, $D_3$, $D_4$. Each quadrant is configured to detect optical signals as explained above.

Method

Figure 6:
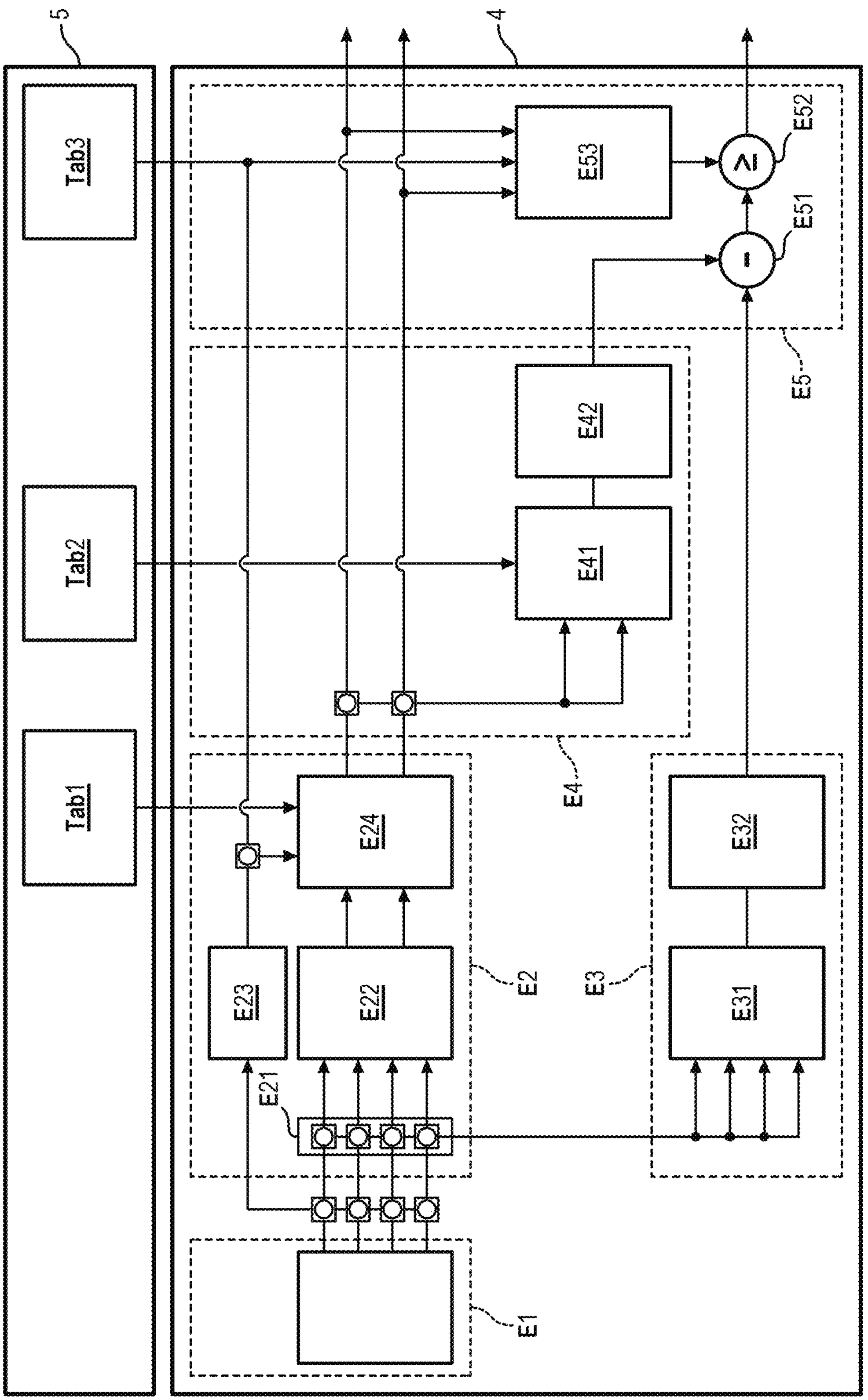
FIG. 6 illustrates steps of a method for locating a target according to an embodiment of the invention.

In the context of a locating method described in relation to FIG. 6, electronic signals corresponding to the optical signals scattered by the target and detected by the photodetector 2 are acquired (step E1). The case where the target is illuminated by a designator 3 is considered.

The acquired signals correspond to the optical signals scattered by the target T to be located and detected by the photodetector 2. One signal is acquired per quadrant.

These signals are then processed in order to determine an angle error in elevation and in azimuth, respectively denoted S(t) and G(t) (step E2). This angle error is directly linked to the position of the spot on the photodetector. In particular, the angle error is obtained from a calculation of weightings, which corresponds to comparisons of the signal levels in different quadrants.

The angle error measured is obtained from the signals detected by each quadrant, as detailed more fully below.

Then, the measured angle error (step E2) is processed (step E4) in order to deduce indicators of the theoretical energy distribution corresponding to the optical signals, in other words of the light spot, in the quadrants. These indicators are simply designated as theoretical indicators.

In parallel, the acquired signals are processed (step E3) in order to calculate indicators of the energy distribution corresponding to the optical signals detected by the quadrants. These indicators are simply designated as measured indicators.

There are therefore, on the one hand, theoretical distribution indicators and, on the other hand, measured distribution indicators.

These theoretical and measured indicators are then compared (step E5) in order to verify their coherence and to validate or not validate the measured angle error.

Determining the Angle Error in Elevation S(t) and in Azimuth G(t) on the Basis of the Acquired Signals (Step E2)

The determination of the angle error in elevation S(t) and in azimuth G(t) comprises a calculation (step E22) of the weightings along these directions. These weightings exploit the detected signal levels in each quadrant and compare the signals on either side of the rows and columns of the matrix of quadrants in the directions along the elevation S(t) and azimuth G(t) axes. In other words, the weightings compare the signal levels of a plurality of quadrants.

According to an embodiment, a four-quadrant detector is considered, as in FIG. 2. There is therefore a matrix of 2×2 quadrants.

The angle error is obtained on the basis of weightings in elevation and in azimuth. In the case of a matrix of 2×2 quadrants, the weighting in elevation is obtained by comparing, two-by-two, the signal levels detected by each quadrant along the axes of elevation and of azimuth. In particular, the weighting in elevation is given by $P_Y=(S_B+S_D-S_A-S_C)/(S_A+S_B+S_C+S_D)$; it compares the signals on either side of the azimuth (vertical) axis and the weighting in azimuth is given by $P_Z=(S_A+S_B-S_C-S_D)/(S_A+S_B+S_C+S_D)$; it compares the signals on either side of the elevation (horizontal) axis.

According to an embodiment, in the case of a photodetector with N×M quadrants, with N×M greater than four, as in FIG. 5, sub-assemblies of 2×2 quadrants are considered in order to simplify the calculations. The weightings in elevation and in azimuth are considered by comparing, two-by-two, each quadrant around each row and column of the matrix of the sub-assembly of 2×2 quadrants along directions parallel to the elevation and azimuth axes.

Figure 7:
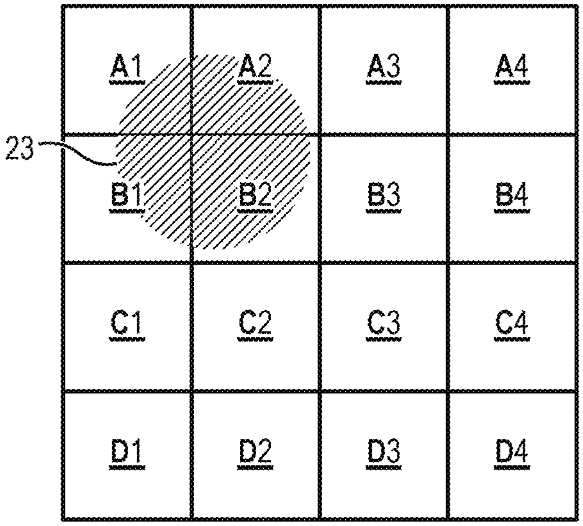
FIG. 7 illustrates a selection mode of a configuration of this detector in a 4×4-quadrant matrix for a corresponding angle error measurement.
Figure 8:
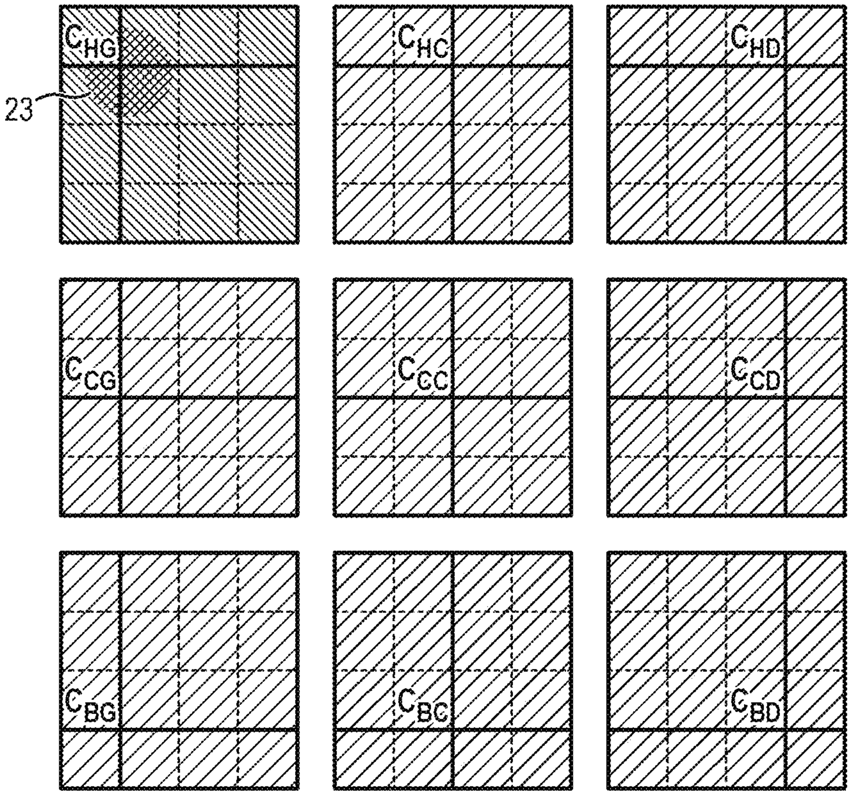
FIG. 8 illustrates several possibilities for selecting 2×2-quadrant configuration for a corresponding angle error measurement of FIG. 6.

FIGS. 7 and 8 illustrate the choice of a configuration of four quadrants when the spot 23 occupies only four quadrants of the 4×4 quadrants of the detector. In FIG. 7, the spot 23 occupies four quadrants: $A_1$, $A_2$, $B_1$, $B_2$. This configuration offers several possibilities for choosing a sub-assembly of 2×2 quadrants. FIG. 8 illustrates these possibilities $C_{HG}$, $C_{HC}$, $C_{HD}$, $C_{CG}$, $C_{CC}$, $C_{CD}$, $C_{BG}$, $C_{BC}$, $C_{BD}$. In order to calculate the angle error, it is necessary to choose one of these configurations from those which detect signals. These are the configurations $C_{HG}$, $C_{HC}$, $C_{CG}$ and $C_{CC}$ since they have at least one quadrant which detects the signal. However, it is observed that only configuration $C_{HG}$ detects the signal on its four quadrants.

Consequently, the method comprises a sub-step (step E21) of selecting a configuration of 2×2 quadrants for calculating weightings, the selected configuration being that for which the detected signal level is highest. In other words, it is that which will give the highest signal-to-noise ratio which will be maintained for the rest of the method.

On returning to the example of FIG. 7, the angle error is then calculated over the signals coming from quadrants $A_1$, $A_2$, $B_1$ and $B_2$. It is understood that the weightings $P_Y$ and $P_Z$ have identical expressions to those given above, but applied to the selected configuration of 2×2 quadrants. In other words, this embodiment is reduced to the four-quadrant situation illustrated above in connection with FIG. 3*a*.

According to another embodiment, a situation is considered in which the spot 23 occupies more than four quadrants on the detector with N×M quadrants. In this case, in order to improve the detection, it is useful to consider more than 2×2 quadrants. This is illustrated in FIGS. 9 and 10.

Figure 9:
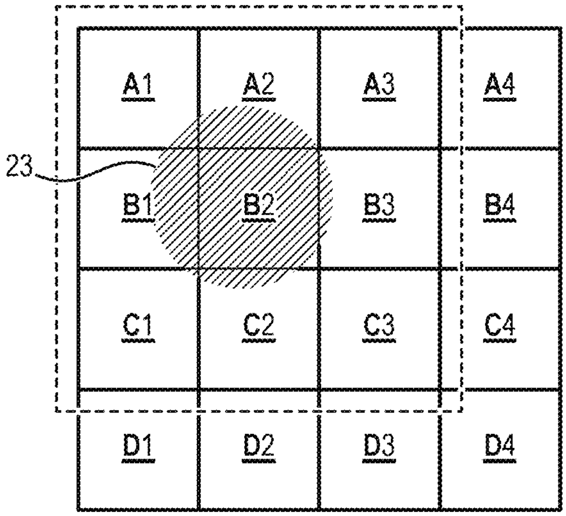
FIG. 9 illustrates another example of distribution of a spot on a 4×4-quadrant detector.
Figure 10:
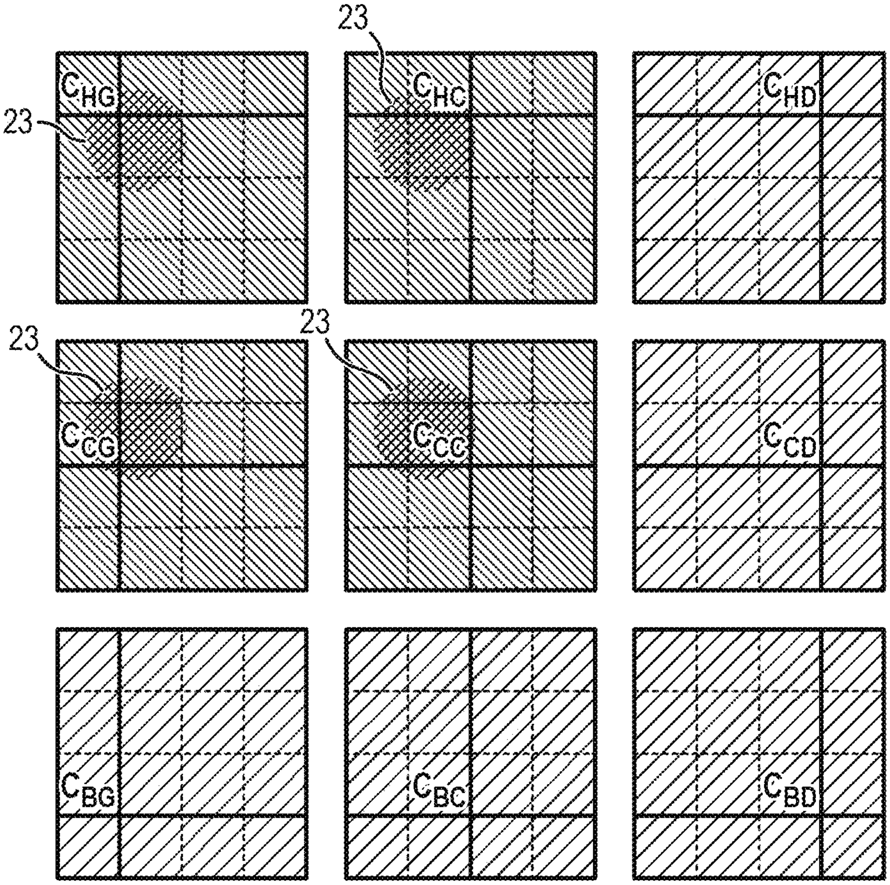
FIG. 10 illustrates several possibilities for selecting a matrix with more than four quadrants for a corresponding angle error measurement of FIG. 9.

In FIG. 9, the spot 23 reaches eight contiguous quadrants which are inscribed, in the example, in a matrix with 3×3 quadrants, covering: $A_1$, $A_2$, $A_3$, $B_1$, $B_2$, $B_3$, $C_1$, $C_2$, $C_3$. This sub-matrix is delimited by the dashed lines in FIG. 9. This is the smallest matrix which includes all of the quadrants reached by the spot 23. Thus, when the spot 23 covers more than four quadrants, the weightings are established according to a similar principle to the case for four quadrants, but in this more weightings are compared, for example:

comparison of: $A_1$-$B_1$; $A_2$-$B_2$; $A_3$-$B_3$; $(A_1+A_2+A_3)-(B_1+B_2+B_3)$;

comparison of: $B_1$-$C_1$; $B_2$-$C_2$; $B_3$-$C_3$; $(B_1+B_2+B_3)-(C_1+C_2+C_3)$;

comparison of: $A_1$-$A_2$; $B_1$-$B_2$; $C_1$-$C_2$; $(A_1+B_1+C_1)-(A_2+B_2+C_2)$;

comparison of: $A_2$-$A_3$; $B_2$-$B_3$; $C_2$-$C_3$; $(A_2+B_2+C_2)-(A_3+B_3+C_3)$.

More generally, the quadrants detecting a signal define a matrix with Ni×Mi quadrants included in the N×M matrix of photodetector quadrants, Ni being less than or equal to N, Mi less than or equal to M, and the weightings in elevation and azimuth exploiting the signals detected in this matrix of Ni×Mi quadrants detecting signals, the weightings in elevation and in azimuth being respectively obtained by comparing the signals detected on adjacent quadrants taken along the rows of this Ni×Mi matrix on the one hand, and taken along the columns of this Ni×Mi matrix on the other hand. The Ni×Mi matrix is preferably the matrix of smallest dimensions containing quadrants reached by the spot 23, in other words detecting a signal.

Thus, the Ni×Mi matrix of quadrants detecting a signal is scanned in order to compare the signals along the rows and columns.

In this case, the sub-step E21 described above is not implemented and the calculation step of the weightings E22 takes into account more than 2×2 quadrants.

In parallel with the calculation of the weightings, a total signal-to-noise ratio $RSB_{tot}$ is calculated on the basis of the detected signals (step E23). Such a signal-to-noise ratio makes it possible to adapt the criterion used to verify the coherence of the distribution criteria with the dispersions over the signal levels in the quadrants, taking account of this signal-to-noise ratio. Here, it is the "measurement quality" that is adapted to.

Then, based on angle error tables, Tab1, stored in the locating device 1 an interpolation is implemented in order to associate with each weighting measurement, the values of angle errors G(t) and S(t) in azimuth and in elevation respectively (step E24). In an implementation of the invention, a bilinear interpolation is applied, which has the advantage of being simple to implement.

It is understood that the angle error tables depend directly on the geometry of the photodetector.

The tables of angle errors are produced at the factory during calibration of the photodetector on a discretisation of its angular operating range. For each point of the range, the signals leaving the quadrants are recorded. The "laboratory" environment of this characterisation at the factory guarantees the absence of disturbances of the laser signals and therefore makes it possible to constitute a model of the reference nominal operation.

This characterisation at the factory makes it possible to construct a theoretical mapping, consisting of the reference values expected for calculating a metric at any point in the field. This metric is used to verify the coherence of the measurements. This mapping dedicated to "validity" adds to the usual characterisation necessary for the needs of the "angle error" functionality which enables the establishment of correspondences between weightings and angle errors. The mapping of "validity" can therefore exploit the same source data and be formed from the same factory test protocol.

The performance of these mappings, generally proceeds as follows:

a collimated laser flux generated by a bench is directed towards the photodetector along controlled elevations and azimuths;

for each orientation of the incident laser flux, the signals on each of the quadrants of the photodetector are measured;

the theoretical correspondence table between weightings and angle errors is constructed.

At the end of this step E2, the angle errors in azimuth G(t) and in elevation S(t) are obtained. These angle errors are used to locate the target T with respect to the sighting axis of the device, if they are validated in the later steps. This angle error is also used to track a target once located.

Determining the Indicators of the Distribution of the Detected Signals (Step E3)

On the basis of the acquisition of the electronic signals on each of the channels (quadrant) of the photodetector, here the indicators of the distribution of the detected signals are determined (step E31).

The indicators of the measured distribution also comprise the weightings used for the angle error, of half-weightings. Half-weightings are also weightings, but only taking signals two-by-two.

In the four quadrant case, $P_Y$ and $P_Z$ are the weightings which respectively compare the signals at the top and bottom, and in the four quadrant case $P_{Y1}$, $P_{Y2}$, $P_{Z1}$, $P_{Z2}$ are correctly speaking half-weightings since these weightings compare the signals two-by-two, for $P_{Y1}$ the two signals at the top, for $P_{Y2}$ the two signals at the bottom, for $P_{Z1}$ the two signals on the left and for $P_{Z2}$ the two signals on the right, and are given by the following expressions:

$P_{Y1}=(S_B-S_A)/(S_A+S_B)$, weighting comparing the two signals at the top;

$P_{Y2}=(S_D-S_C)/(S_C+S_D)$, weighting comparing the two signals at the bottom;

$P_Y=(S_B+S_D-S_A-S_C)/(S_A+S_B+S_C+S_D)$ weighting comparing the signals on either side of the vertical axis;

$P_{Z1}=(S_A-S_C)/(S_A+S_C)$, weighting comparing the two signals on the left;

$P_{Z2}=(S_B-S_D)/(S_B+S_D)$, weighting comparing the two signals on the right;

$P_Z=(S_A+S_B-S_C-S_D)/(S_A+S_B+S_C+S_D)$ weighting comparing the signals on either side of the horizontal axis.

By adding the calculation of the half-weightings to those of the weightings used in the estimation of the angle error, a redundancy of measured information is created.

More specifically, a unique weighting value is associated with an angle error (elevation or azimuth) (bijectivity), whereas the half-weightings can take several pairs of values according to the angle error on the other axis (azimuth or elevation, respectively). However, only one pair of values for the half-weightings verifies the geometric and radiometric coherence expected in theory for the luminous energy distribution on the different quadrants associated with this position in elevation and azimuth of the target.

These calculations can be transposed to any configurations with a plurality of quadrants.

In the case where there are more than four quadrants, the idea is to calculate moreover the weightings necessary for the angle error of other quantities associated with the distribution of the spot 23 on the photodetector. Thus, a person skilled in the art understands that a multitude of indicators can be calculated.

On the basis of these weightings, a metric is then determined (step E32) 2 on the basis of the measured indicators. The purpose of this metric 2 is to characterise the energy distribution of the laser spot 23 on the various quadrants of the photodetector. In an example, an easily applicable metric 2 is based on a maximum absolute deviation between the weightings and the half-weightings. Such a metric Q is, for example, given by the following expression in the case of four quadrants:

$$\Omega=\max([\mathrm{abs}(P_{Y1}-P_{Y2});\ \mathrm{abs}(P_{Z1}-P_{Z2});\ \mathrm{abs}(P_{Y1}-P_{Y});\ \mathrm{abs}(P_{Z1}-P_{Z});\ \mathrm{abs}(P_{Y2}-P_{Y}),\ \mathrm{abs}(P_{Z2}-P_{Z})]).$$

Of course, in the case of configurations with more than four quadrants, this always involves calculating a metric based on the weightings and half-weightings.

Other metrics could be used, for example a metric based on calculations of distance by reference to a spot which respects the theoretical shape.

Determining the Theoretical Distribution Indicators of the Signals for the Acquired Angle Error (Step E4)

On the basis of the angle errors measured in step E2, by interpolation, for example bilinear interpolation, with theoretical mappings of weightings and half-weightings Tab2, theoretical indicators are determined for this measured angle error (step E41).

Here, this involves obtaining expected weightings and half-weightings for the angle error measured by symmetry with the obtaining of the theoretical indicators of the distribution of the acquired signals.

These indicators are denoted here as $P'_Y$, $P'_Z$, $P'_{Y1}$, $P'_{Y2}$, $P'_{Z1}$, $P'_{Z2}$. The mappings of the theoretical indicators Tab2 (here theoretical weightings and half-weightings) are obtained in the factory in a similar manner to the mappings Tab1.

These theoretical indicators have the same expressions as the measured indicators, with the difference that they have been calculated from electronic signals $S'_A$, $S'_B$, $S'_C$, $S'_D$ measured at the factory on the quadrants.

It is then possible to characterise the energy distribution of the laser spot on the quadrants of the photodetector corresponding to these theoretical indicators (step E42). A metric Q' is applied which has the same definition as the metric 22 applied in step E32.

Returning to the preceding example, the metric Q' is thus based on a maximum absolute deviation between the theoretical weightings and the theoretical half-weightings, and given by the following function:

$$\Omega''=\max([\mathrm{abs}(P'_{Y1}-P'_{Y2});\ \mathrm{abs}(P'_{Z1}-P'_{Z2});\ \mathrm{abs}(P'_{Y1}-P'_{Y});\ \mathrm{abs}(P'_{Z1}-P_{Z});\ \mathrm{abs}(P'_{Y2}-P'_{Y}),\ \mathrm{abs}(P'_{Z2}-P'_{Z})]).$$

Verifying the Coherence of the Theoretical Distribution and Measured Distribution Indicators (Step E5)

The verifying of the coherence between the indicators of the theoretical and measured distributions is advantageously implemented by comparison (step E51) of the metrics Q and 2" and comprises calculating a comparison criterion between these metrics.

Such a criterion is given by the following formula: Crit=abs(Ω-Ω") namely an absolute difference of the two metrics.

This criterion is then compared to a threshold (step E52). Two cases can be distinguished:

- first case: if Crit≥S then the current angle error is invalid. In other words if the absolute difference between the two metrics Ω' and Ω is greater than or equal to the threshold value, then this angle error is considered "aberrant or invalid";
- second case: if Crit<S then the current angle error is valid. In other words, if the absolute difference between the two metrics Ω and Ω' is less than the threshold value, then this current angle error is "validated".

According to an embodiment, the threshold S is arbitrarily fixed and advantageously results in a compromise between

- a rate of false alarms characterising the proportion of valid angle errors which are invalidated:
- a rate of detection characterising the proportion of aberrant angle errors that are identified as such by the criterion.

In a complementary manner (step E53), it may be necessary, depending on the compromise sought, to add one or more dependencies to the threshold such as

- a dependence on the signal-to-noise ratio $RSB_{tot}$ of the measured signals, which makes it possible to stabilise the rate of "false alarms" over the operating range by an increase in the threshold value at low $RSB_{tot}$ and by a reducing this value at high $RSB_{tot}$,
- a dependence on the position in the angular range, which makes it possible to adjust the performance of the coherence calculation in the field.

In the first case, the signal-to-noise ratio $RSB_{tot}$ of the measured signals is used to define the applicable threshold, by interpolation of Tab3 data established for a few angular positions in elevation and azimuth, and based on a few tabulated levels of the $RSB_{tot}$. Therefore, the threshold depends on the measured angle error.

In the second case, an interpolation is performed in a mapping of the threshold according to the measured (current) angle error by using the Tab3 data.

At the end of the comparison with the threshold, a validity status of the measured angle error is obtained.

Other Applications

The method has been described in the context of a photodetector having a matrix with a plurality of quadrants.

However, various alternatives are possible and they result from the same principle which consists of exploiting the a priori knowledge of the energy distribution of the spot on a multi-quadrant photodetector.

The spot can have a different geometry from a uniformed disc. Other shapes are sometimes preferred, in order to simplify or compact the optical element upstream of the photodetector and/or as a consequence of incorporation in a device combining a plurality of optronics channels, for example in the case of a piece of equipment (with central shutter) and/or to favour certain specifications of the deviation measurement response, for example, a reduced dependence on the size of the spot on the target and/or on the distance between the target and the SAL sensor, whether it be of LST or SALH type.

These other spot geometries on the photodetector can be, in particular: a ring type shape, a "Gaussian" type shape, a "square" type shape, a shape based on those mentioned above and having a spatial modulation resulting from optics elements for reducing scintillation effects.

The multi-quadrant photodetector can be of the four-quadrant type, as taken more particularly in the previous example; this is the usual geometry; but it can have any other geometry which, combined with the theoretical size and shape of the laser spot, enables an anomaly to be identified in the energy distribution over the quadrants. In particular, as described above, a first family of extensions covers photodetectors with N×M elements, each element being square or rectangular. Another family of extensions groups the photodetectors with geometries having a number of angular sectors greater than 4.

Laser deviation measurement using a multi-element photodetector is applied in many fields.

In the context of semi-active weapon guidance or laser target pointing, a target intercepts the beam and scatters part of the energy to the SAL sensor.

In other contexts, multi-element photodetectors are combined with lasers in direct configurations. In these direct configurations, the laser is directed towards the sensor equipped with a multi-element photodetector and the sensor develops an angle error in order to assist the pointing and/or relative movement of a carrier module of the laser and of a carrier module of the sensor. This type of direct configuration instrumentation is used in multiple fields, such as the space field, the field of industrial machines, the field of public works and the field of autonomous vehicle guidance, in particular in cooperative contexts. In the last two fields, disruptive phenomena can be encountered, to which the invention provides a response: the problem of non-homogeneity caused by atmospheric scintillation, and the problem of parasitic flux.

The invention claimed is:

1. A method for locating a target by means of a detecting device comprising a photodetector comprising N×M quadrants positioned with respect to a sighting axis of the detecting device, the photodetector being configured to detect optical signals from the target to be detected, the photodetector comprising quadrants distributed along two perpendicular axes called elevation Z and azimuth Y axes, said method being implemented in a processing unit of said device and comprising the following steps, the target scattering an optical signal:

acquiring the signals detected by each quadrant, which correspond to the signals scattered by the target toward the quadrants;

processing the acquired signals to determine an elevation angle error and an azimuth angle error of the direction of the target with respect to the sighting axis of the device;

processing the acquired signals with a view to deducing therefrom indicators of the distribution of the signals detected by the quadrants;

processing the determined elevation angle error and azimuth angle error with a view to deducing therefrom indicators of the theoretical distribution of the signals in the quadrants for these angle errors; distribution indicators of the signal in the quadrants being obtained by means of theoretical and measured weighting values, said weightings being based on the levels of the signals detected by the quadrants, verifying the coherence of the theoretical distribution indicators with the distribution indicators obtained using the acquired signals so as to determine whether the measured angle error is valid.

2. The method according to claim 1, wherein, the theoretical distribution indicators of the signals in the quadrants is obtained by interpolation, preferably bilinear interpolation, of the angle errors with a mapping of the theoretical distribution indicators of the signals as a function of a plurality of theoretical angle errors.

3. The method according to claim 1, wherein the N×M quadrants of the photodetector are distributed along two mutually perpendicular axes, referred to as the elevation axis Z and azimuth axis Y, the quadrants detecting a signal defining a sub-matrix included in the N×M matrix, of size Ni×Mi quadrants, with Ni less than or equal to N, and Mi less than or equal to M, and detecting signals, the distribution indicators of the signals being obtained by comparing the signals detected on adjacent quadrants taken along the rows of the Ni×Mi matrix on the one hand, and taken along the columns of the Ni×Mi matrix, on the other hand.

4. The method according to claim 1, wherein verifying the coherence consists of calculating a comparison criterion between a first metric based on the theoretical distribution indicators and a second metric based on the distribution indicators of the acquired signals, the criterion being compared with a threshold in order to validate the angle error measurements.

5. The method according to claim 4, wherein the comparison criterion is defined by an absolute difference between the first and second metrics, the angle error being valid if this criterion is less than a threshold and invalid if this criterion is greater than or equal to said threshold.

6. The method according to claim 4, wherein the threshold is adjusted as a function of the signal-to-noise ratio measured on each quadrant and/or of the determined angle error.

7. The method according to claim 1, wherein the photodetector comprises four quadrants A, B, C, D, quadrants A and B being above the elevation axis Z, quadrants C and D being below the axis Z, quadrant C being below quadrant A, quadrant D being below quadrant B, the distribution criteria of the signals over the quadrants being defined in the following manner:

$Y_1=(B-A)/(A+B)$, weighting comparing the top two signals;

$Y_2=(D-C)/(C+D)$, weighting comparing the bottom two signals $Y=(B+D-A-C)/(A+B+C+D)$ weighting comparing the signals on either side of the vertical axis;

$Z_1=(A-C)/(A+C)$, weighting comparing the two signals on the left $Z_2=(B-D)/(B+D)$, weighting comparing the two signals on the right $Z=(A+B-C-D)/(A+B+C+D)$ weighting comparing the signals on either side of the horizontal axis.

8. The method according to claim 7, wherein the metrics based on theoretical or measured distribution criteria are defined by $\max([\text{abs}(Y_1-Y_2);\ \text{abs}(Z_1-Z_2);\ \text{abs}(Y_1-Y);\ \text{abs}(Z_1-Z);\ \text{abs}(Y_2-Y),\ \text{abs}(Z_2-Z)])$ with max the maximum value and abs the absolute value.

9. A device for detecting a target comprising a photodetector with a plurality of quadrants and a processing unit configured to implement a method according to claim 1.

10. A system for guiding a missile towards a moving target, said device including a detection device according to claim 9.

11. A computer program product comprising code instructions for implementing a method according to claim 1, when it is executed by a computer.

* * * * *